US005157411A

United States Patent [19]

Takekoshi et al.

[11] Patent Number: 5,157,411

[45] Date of Patent: Oct. 20, 1992

[54] RECORDING HEAD AND A RECORDING DEVICE UTILIZING THE RECORDING HEAD

[75] Inventors: Nobuhiko Takekoshi; Hisashi Fukushima; Haruhiko Moriguchi, all of Yokohama, Japan

[73] Assignee: Canon Kabushiki Kaisha, Tokyo, Japan

[21] Appl. No.: 649,721

[22] Filed: Feb. 1, 1991

[30] Foreign Application Priority Data

Feb. 2, 1990 [JP] Japan .................................... 2-22192

[51] Int. Cl.[5] ............................................ G01D 15/18

[52] U.S. Cl. ............................... 346/1.1; 346/76 PH; 346/140 R

[58] Field of Search ................ 346/76 PH, 140 R, 1.1

[56] References Cited

U.S. PATENT DOCUMENTS 4,313,124 1/1982 Hara .................................... 346/140
4,345,262 8/1982 Shirato et al. ....................... 346/140
4,447,819 5/1984 Moriguchi et al. ............ 346/76 PH
4,459,600 7/1984 Sato et al. ........................... 346/140
4,463,359 7/1984 Ayata et al. .......................... 346/1.1
4,475,114 10/1984 Koyama et al. ............... 346/76 PH
4,520,373 5/1985 Ayata et al. .................... 346/140 R
4,558,333 12/1985 Sugitani et al. ...................... 346/140
4,723,129 2/1988 Endo et al. ........................... 346/1.1
4,740,796 4/1988 Endo et al. ........................... 346/1.1
4,875,056 10/1989 Ono ................................ 346/76 PH

FOREIGN PATENT DOCUMENTS 279637 8/1988 European Pat. Off. .
318328 5/1989 European Pat. Off. .
59-123670 7/1984 Japan .
59-138461 8/1984 Japan .

*Primary Examiner*—Benjamin R. Fuller
*Assistant Examiner*—Gerald E. Preston
*Attorney, Agent, or Firm*—Fitzpatrick, Cella, Harper & Scinto

[57] ABSTRACT

A recording head has a plurality of arranged recording elements, wherein the recording elements are selectively supplied with driving signals and driven by electrical energy. The head includes a dividing unit for dividing a plurality of arranged recording elements into at least two blocks each simultaneously operable, and correcting unit for correcting the characteristics of the recording elements in accordance with electrical energy at respective blocks, whereby the recording head's life is prolonged and a high quality picture image can be obtained.

32 Claims, 5 Drawing Sheets

RECORDING HEAD AND A RECORDING DEVICE UTILIZING THE RECORDING HEAD

BACKGROUND OF THE INVENTION

1. Field of the Invention

The present invention relates to a recording head for use in a printer, a facsimile device, a copying machine, etc., and to a recording device utilizing the recording head.

2. Related Background Art

Currently, as a recording head for use in a printer, a facsimile device, copying machine, etc., a so-called multi-recording head is used wherein a plurality of recording elements are arranged on a single recording head so as to achieve shortening of recording time and high speed recording.

However, because of manufacturing restrictions, where the respective recording elements on the single multi-recording head are driven under the same recording condition, it is very difficult to obtain evenness in recording characteristics of respective recording elements, and consequently the thickness in a recorded picture image becomes uneven. And when obtaining evenness in recording characteristics is pursued, the production rate of usable recording heads becomes low.

As one measure to obviate the above defects, a constitution can be proposed wherein correcting means for correcting the amount of energy to be applied to the respective recording elements in accordance with the respective recording characteristics thereof is provided on the recording head having recording elements of uneven recording characteristics.

However, where the number of correcting means to be provided on the recording head increases or the recording density rises, the number of recording means to be provided increases, and consequently the device becomes large and the production cost becomes high.

SUMMARY OF THE INVENTION

Therefore, an object of the present invention is to provide a recording head and a recording device utilizing the recording head, wherein the recording characteristics of the respective recording elements are corrected by simple correcting means so as to prevent thickness unevenness.

Another object of the present invention to provide a recording head comprising simple recording means, whereby the production rate of usable recording heads is enhanced.

The recording head according to the present invention having a plurality of recording elements, wherein the recording elements are arranged and selectively supplied with driving signals and driven by electrical energy, thereof, for performing a recording operation comprises: dividing means for dividing the plurality of arranged recording elements into at least two blocks each wherein simultaneous driving can be performed; and correcting means for correcting the characteristics of the recording elements with respect to the electrical energy at respective blocks divided by the dividing means.

The recording device according to the present invention is a recording device utilizing a recording head having a plurality of arranged recording elements, wherein the plurality of recording elements are selectively supplied with driving signals and driven by the electrical energy thereof, comprising: supply means for selectively supplying an electrical signal by a predetermined unit to the plurality of the recording elements arranged on the recording head; and correcting means for correcting by the predetermined unit the electrical signal supplied by the supply means so as to correct the characteristics of the recording elements with respect to the electrical energy.

DESCRIPTION OF THE PREFERRED EMBODIMENT

Preferred embodiments of the present invention will be described referring to the attached drawings hereinafter.

Figure 1:
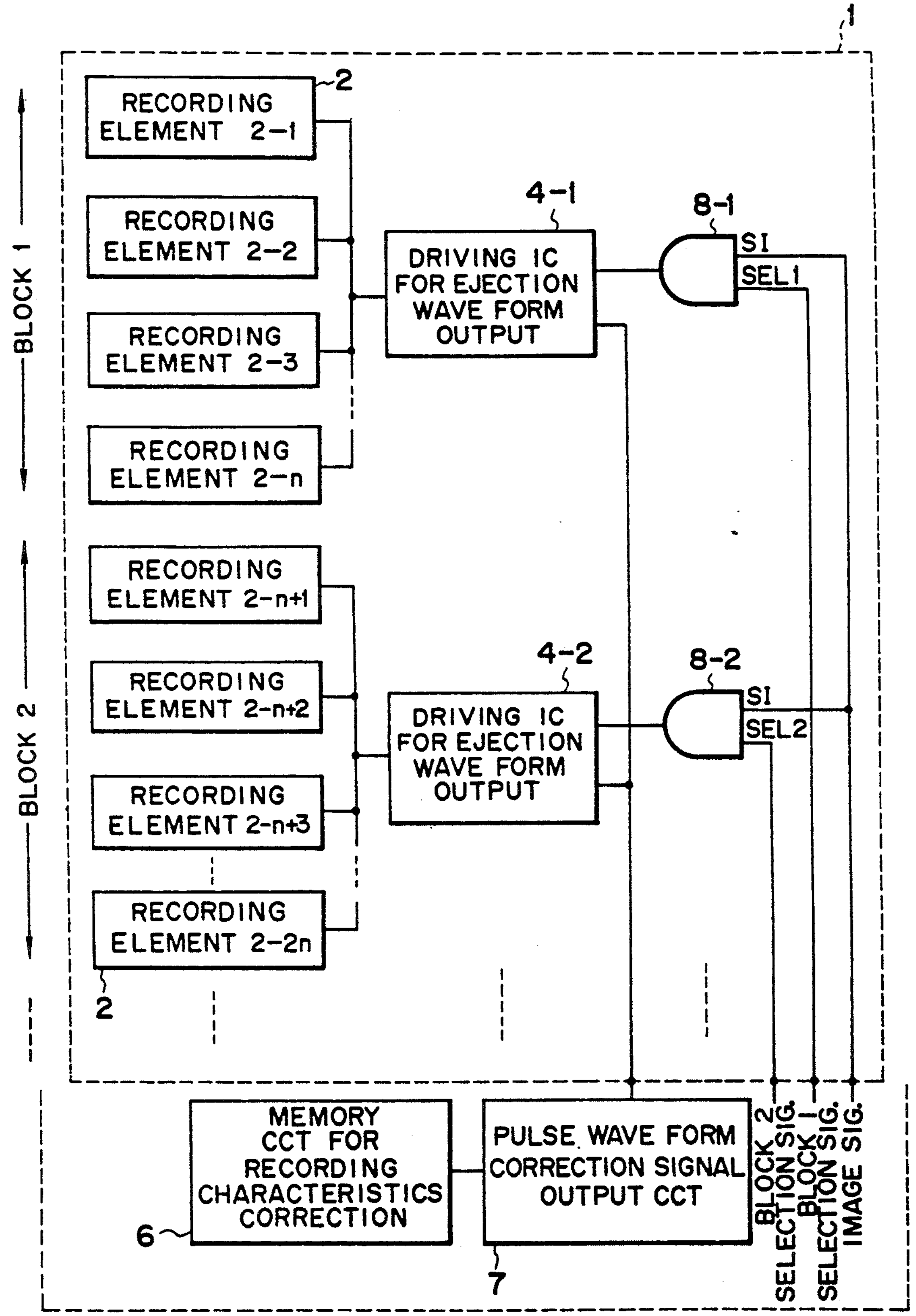
FIG. 1 is a block diagram showing a constitution of a driving circuit according to an embodiment of the present invention.

FIG. 1 illustrates a driving system for a recording head according to a first embodiment of the present invention. In the figure, the recording head 1 comprises a plurality of recording elements 2 (2-1, 2-2, . . . , 2-n, 2-n+1, . . . , 2-2n), which are divided into blocks each having n recording elements. The recording elements belonging to the blocks 1 and 2 are respectively driven by output pulses supplied from driving ICs 4-1 and 4-2 for ejection wave form output (referred to as ejection wave form output ICs 4-1 and 4-2 hereinafter). It should be noted, that, although the basic constitution of the recording head according to this embodiment is not greatly different from that of the conventional recording head wherein thickness correcting operation is not performed, the recording head according to this embodiment is characterised in that characteristic correction for the recording elements can be realized at low cost only by providing on the recording device body 5 itself a memory circuit 6 for recording characteristics correction (hereinafter referred to as recording characteristics correction memory circuit 6) which stores recording characteristic correction data of IC4-1 and IC4-2.

Numeral 7 denotes a pulse wave form correction signal output circuit for reading correction data supplied out of the recording circuit 6 so as to output a signal for correcting pulse wave form supplied from the driving ICs 4-1 and 4-2.

In the recording head driving system having the above constitution, either a combination of a picture image signal S1 and a selection signal SEL1 or a combination of a picture image signal S1 and a selecting signal SEL2 is alternately supplied to the driving ICs 4-1 and 4-2, and a wave form correction signal is supplied from the pulse wave form correction signal output circuit to the driving ICs 4-1 and 4-2. In the drive ICs 4-1 and 4-2, output wave forms respectively predetermined are corrected in accordance with the above correction signals, and signals having corrected pulse wave forms are supplied to the respective recording elements 2, so that, for example the diameters of dots of a recorded picture image can be corrected as a whole.

Figure 2:
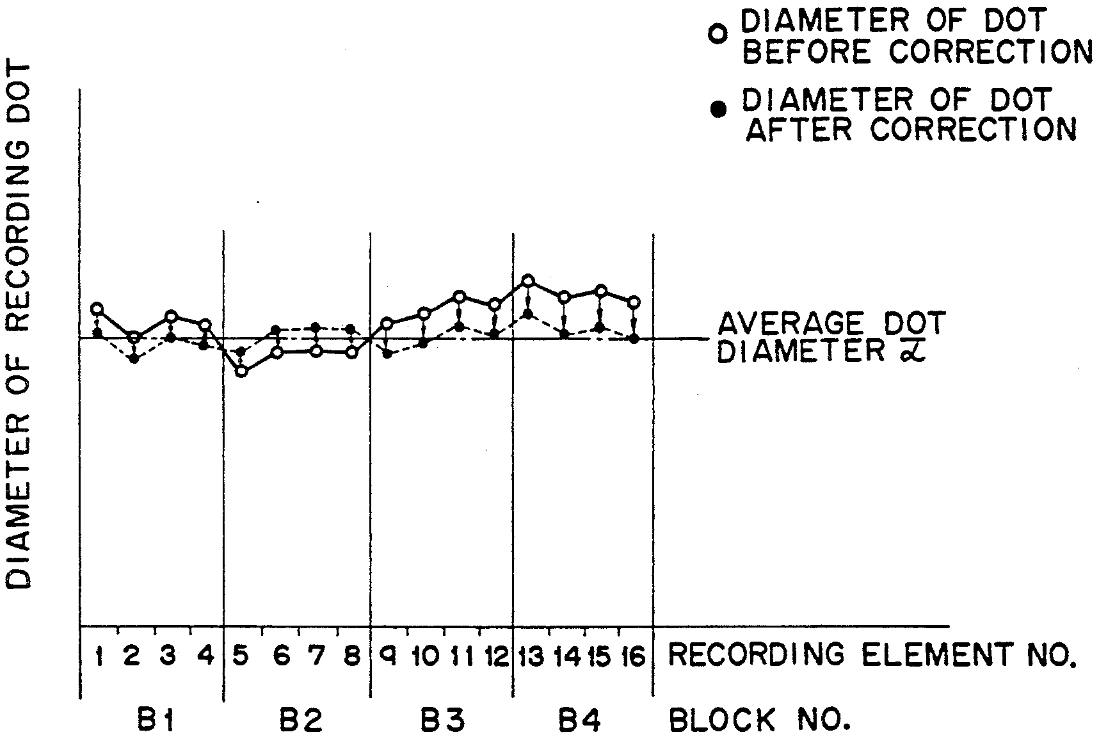
FIGS. 2 and 3 are views for illustration with graphs showing an example of correcting operations at each block according to the present invention.
Figure 3:
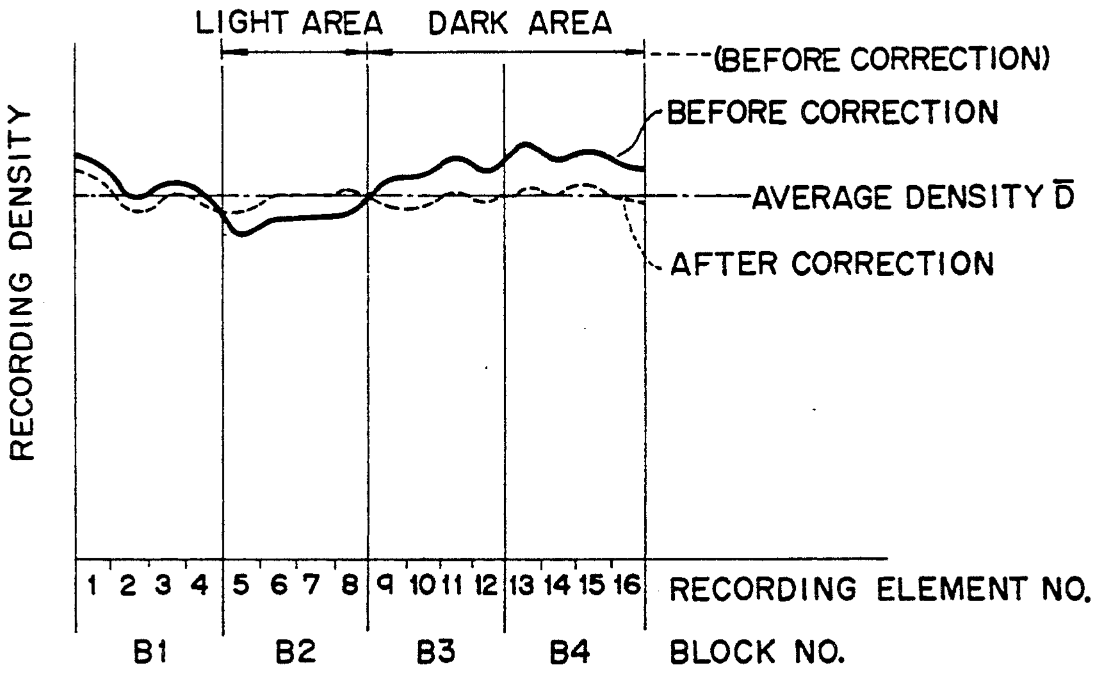

Suppose that a recording density of recording head 1 is set to a high resolution, for instance, of 400 dpi and that the recording elements 1, 2, 3, . . . , 16, . . . on the recording head are driven separately at respective blocks, i.e., blocks B1, B2, B3, . . . as shown in FIGS. 2 and 3. In addition, suppose that diameters of recording dots, as a recording characteristic, is diverse according to respective recording elements as denoted by white circles in FIG. 2.

Where unevenness in thickness is visually recognized in an actual recorded picture image, the thickness unevenness appears because diversity in diameter of recording dots, which is caused by diversity in recording characteristic of recording elements, appears to the eyes of viewers thickness distribution represented by an averaged continuously shaped line, as shown by solid line in FIG. 3. In other words, diversity in recording dot depending on respective recording elements are recognized as an areal thickness uneveness having a width wider than a pitch between the recording elements on the recording image, such as the areas having a thick recording thickness or an area having a light recording thickness.

To obviate the foregoing defects, according to this embodiment, correction for respective recording elements of the recording head is performed separately at each block having a plurality of recording elements. More specifically, with respect to the recording elements in the area having thick recording thickness, that is, the area having relatively high average dot diameter, for example, the recording elements belonging to recording element blocks B1, B3 and B4, correcting operation is performed so as to lower the recorded thickness of all the plurality recording elements at a time, while with respect to the recording elements belonging to the area having relatively light thickness, as in the recording element block B2, correcting operation is performed so as to elevate recorded thickness of all the plurality of recording elements at a time.

Thus, in the first embodiment, as denoted by black circles in FIG. 2 and broken line in FIG. 3, the thickness unevenness on the actual recorded picture images having a width wider than the pitch of the recording elements, conspicuous to the eyes of viewers, can be improved by correcting recording characteristics at respective recording blocks, not by employing a constitution in which recording characteristic is corrected respectively at each recording element.

In the first embodiment, description was as to the case where correction of recording characteristic is performed at each block corresponding to one IC block.

However, in some recording head, there is a large diversity between the middle part and the both end parts. Particularly, in the so called full-multi-ink-jet head having a long recording head length, the diversity between the middle part and the both end parts is remarkably large because of problems in the ink supply path, etc. Further, in some of thermal heads, there is diversity in thickness caused by the difference in temperature between both end parts and the middle part.

To obviate these problems, as a second embodiment (not shown), a constitution is also effective in which by grouping the correction data corresponding to several ICs in accordance with the first embodiment into one block so as to divide all the correction data into three blocks, i.e. blocks in both end parts and a middle part. With this constitution, the number of correction data can be decreased, and therefore the memory capacity of the memory circuit 6 is decreased. Thus, in the present invention, constitution is not necessarily limited to one in which one IC is grouped as one block.

Next, a third embodiment will be described hereinafter. The third embodiment is oriented to prolongation of a recording head's, life. In the recording head, such as in a thermal head or ink jet head utilizing heat energy, where the diversity in the recording head is caused by the diversity in the resistor values at respective elements, where driving application energy is determined in accordance with recording elements having lower resistance, energy is applied to the recording elements having higher resistance above a required level, and therefore the life of the recording head is likely to be shortened.

In the third embodiment, an ink jet multi-head utilizing heat energy will be described with a concrete example.

Figure 4:
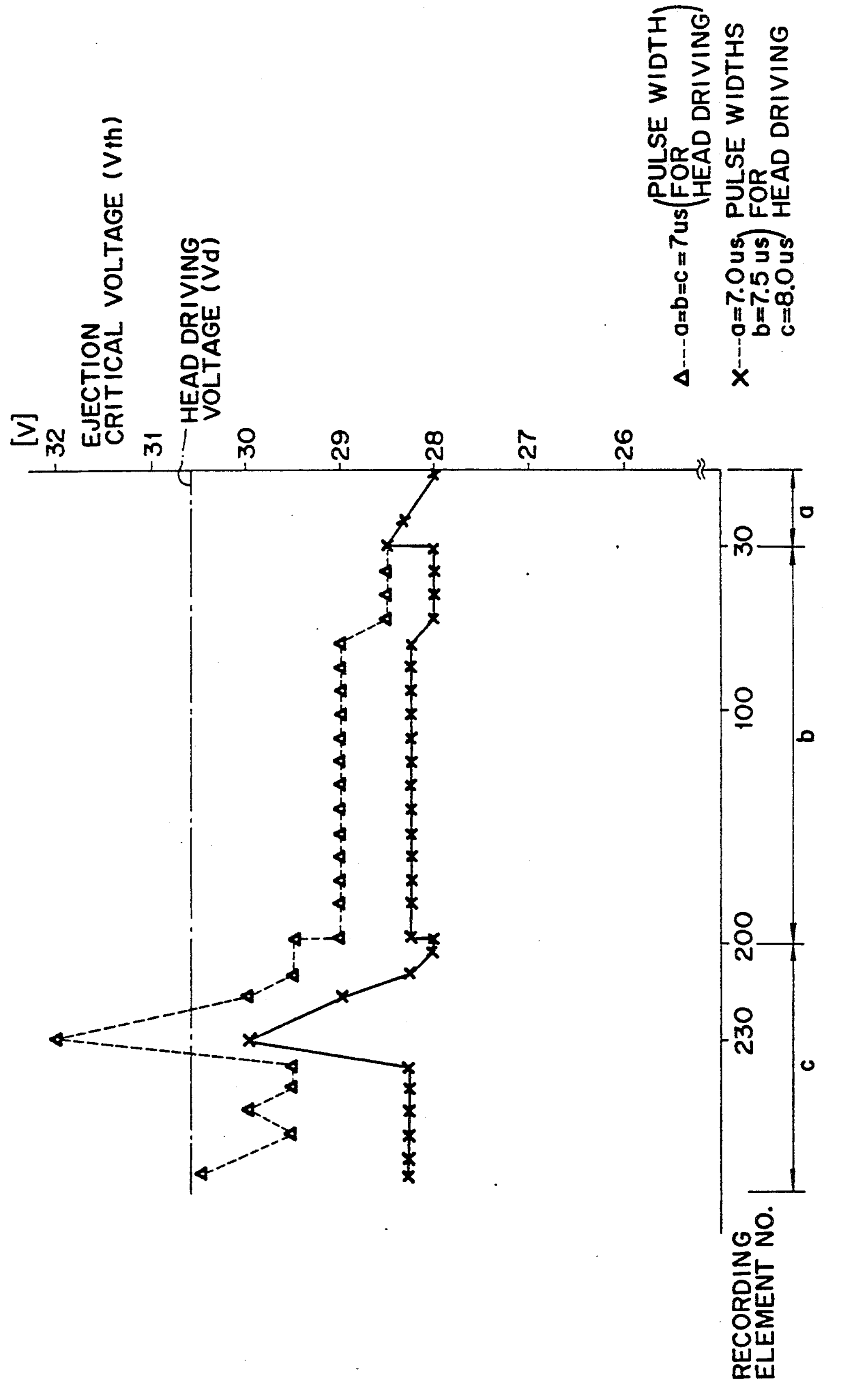
FIG. 4 is a view for illustration with a graph showing an example of a correction according to another embodiment wherein the present invention is applied to an ink jet recording head utilizing thermal energy.

FIG. 4 is a view showing an example of diversity in ejection critical voltage (Vth) on the above-mentioned multi-head. The ejection critical voltage in this context means the lowest voltage required to eject ink out of each orifice of the multi-head. It should be noted that, in this embodiment, rectangular pulse wave form having pulse width 7 μs is applied to all the ranges a, b and c, marks representing ejection critical voltages of respective recording elements before correction. The head driving voltage (Vd) in the figure is set corresponding to the recording element having the lowest ejection critical voltage in one recording head. In this case, the head driving voltage is set to 30.8 [V] obtained by multiplying by 1.1 the lowest ejection critical voltage 28 [V] of the recording element No. 1. The voltage value is set so that the voltage is the most suitable for the recording element having the lowest ejection critical voltage when operated at this voltage, in other words, the value enabling the most suitable operation.

However, in the recording element (No. 230) wherein, as shown in the figure, the head driving voltage (Vd) does not reach ejection critical voltage represented by mark, ink is not ejected. To the contrary, if the optimal driving voltage ($32[V]\times 1.1=35.2[V]$) of the recording element (No. 230) is applied, the other recording elements, for instance No. 1, is applied with an excessive voltage, so that the life of the recording head is remarkably shortened.

To obviate the foregoing problem, by dividing the range into three areas a, b and c, as shown in the figure the recording elements belonging to respective areas a, b, and c are respectively driven by pulses having pulse widths 7 μs, 7.5 μs and 8 μs. By setting the pulse width to be long, generated thermal energy is increased, and therefore the ejection critical voltage [Vth] is substantially lowered. With this constitution, as is represented by x, the diversion in the ejection critical voltage [Vth] of respective recording elements is restrained than in the case of no correction represented by mark Δ.

With this constitution according this embodiment, although there is diversity among the recording elements, non-ejection of ink and shortening of the head's life can be prevented.

Generally speaking, in the recording head having such constitution as this embodiment, diversity among the recording elements is so large that the recording head cannot be put into practical use. In contrast, in the present embodiment, although the division into blocks is rough, pulse widths are controlled at respective blocks, and therefore stable recording can be achieved and the production rate of usable recording head is enhanced. In addition, as to a head having the smallest diversion, driving can be effected at an even and a nearly optimal voltage and pulse width, and therefore recording head's life can be prolonged and diversity in diameter of ejection dots caused by diversity application energy can be prevented. Incidentally, a voltage value or a current value may be controlled instead of the pulse width.

Figure 5:
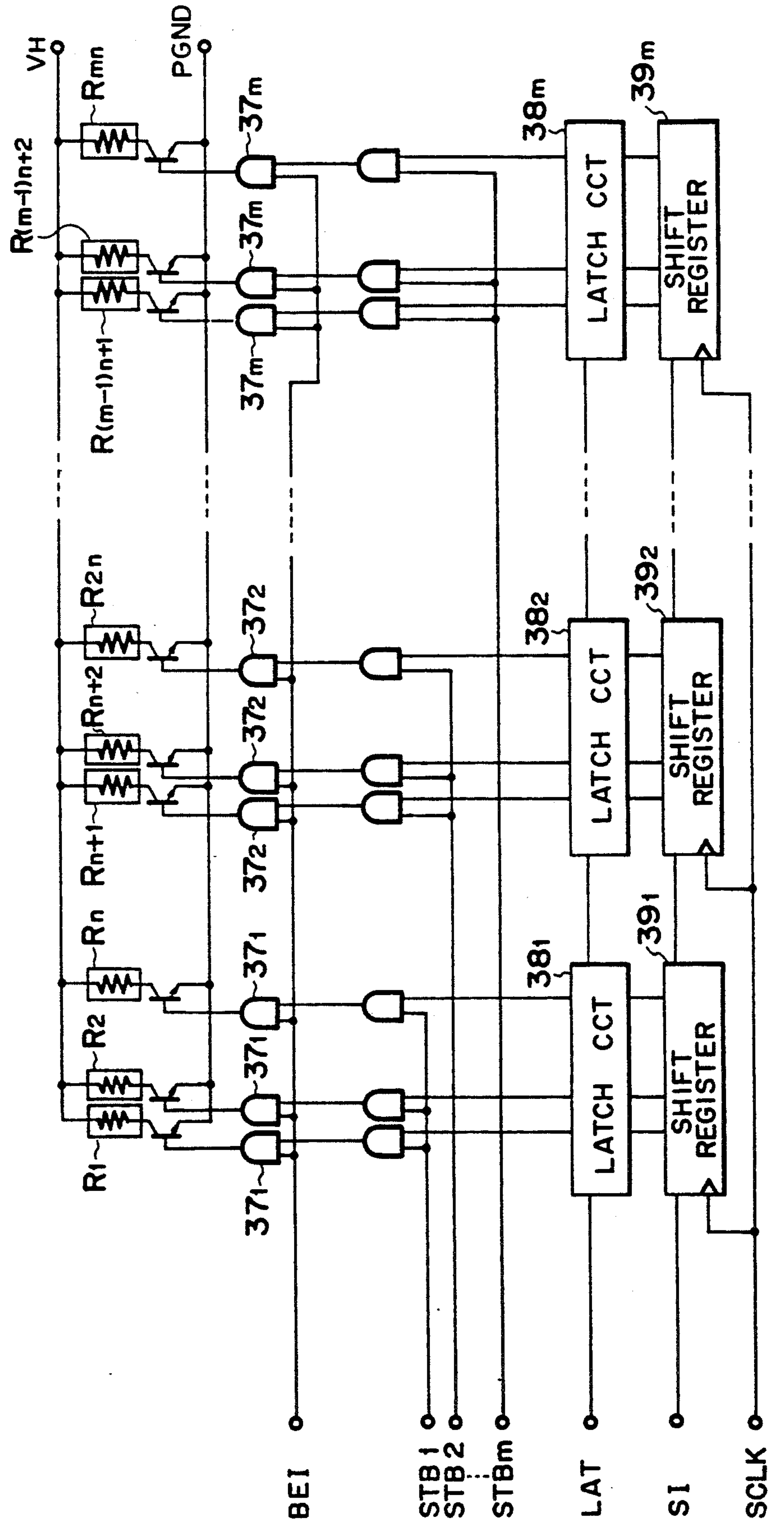
FIG. 5 is a block diagram showing a constitution according to still another embodiment of the present invention.

FIG. 5 shows a constitution of the recording head driving circuit according to a fourth embodiment. In this figure is shown a driving circuit for driving electricity-heat converters belonging to m (=37) blocks, each block including n (=128) electricity-heat converters (resistors). Therefore, n electricity-heat convertors correspond to one unit of driving IC comprising a latch circuits $38_l$ to $38_m$, shift register $39_l$ to $39_m$ and AND gates $37_l$ to $37_m$. Further, in the figure, $R_l$ to $R_{mn}$ each denotes an electricity-heat converter having one end connected a common electrode V for applying voltage $V_H$ to the converters, and the other end connected to earth terminal $P_{GND}$. Therefore, the shift registers $39_l$ to $39_m$ are respectively an n-bit shift registers, each output of which corresponds to the corresponds to each of n electricity-heat converters of each block.

Symbol SI denotes a terminal for inputting recording data SI which is serially inputted into the shift register at the first stage in accordance with recording data transmitting clocks SCLK, and serially shifted, and thus n×m recording data SI is stored in the registers $39_l$ to $39_m$.

After transmitting recording data of one line, these data are latched by the n-bit latch circuits $38_l$ to $38_m$ in accordance with the signals LAT input. Thus, correspondence between each of electricity-heat converter element $R_l$ to $R_{mn}$ and recording data is made. It should be noted that the recording data transmitting clock SCLK for transmitting data to the shift registers $39_l$ to $39_m$ inputs as many clock pulses as electricity-heat converters on one line.

BEI represents a terminal for inputting a basic signal BEI, the pulse width thereof being a conducting time correspondent to the electricity required for driving in a divided manner and corresponding to energy required for ejecting ink to electricity heat converter elements $R_l$ to $R_{mn}$. It should be noted, in this embodiment, the pulse width of the signal BEI can be variable corresponding to the block to be driven.

Symbols $STB_l$ to $STB_m$ each designate strobe signals, while each of the driving blocks to be supplied with these signals comprises n (=128) elements.

In the recording head having such constitution, 4736-bit recording image signals corresponding to one recording line is input, and the recording picture image signal is latched by the latch signal LAT to the respective latch circuits $38_l$ to $38_m$, and strobe signals $STB_l$ to $STB_m$ (in this case m=37) are serially turned on, thereby completing drive of each driving block.

As described above, in the present embodiment, recording elements can be driven at different pulse width at each driving block (m=1 to 37). That is to say that 128 nozzles are controlled as one block by setting the pulse width of the signal BEI to be variable in accordance with data of the pulse width corresponding to each block stored in the memory circuit for storing a recording characteristic correction.

In the above-mentioned embodiment, the characteristic of the recording element can be corrected on the block basis. It should be noted that, although the pulse width of the signal BEI is set to be variable in the above-mentioned embodiment, the pulse width of the strobe signal STB may be set to be variable.

The present invention brings about excellent effects particularly in a recording head, recording device of ink jet system utilizing thermal energy among the ink jet recording system.

As to its representative constitution and principle, for example, one practiced by use of the basic principle disclosed in, for example, U.S. Pat. Nos. 4,723,129 and 4,740,796 is preferred. This system is applicable to either of the so called on-demand type and the continuous type. Particularly, the case of the on-demand type is effective because, by applying at least one driving signal which gives rapid temperature elevation exceeding nucleate boiling corresponding to the recording information on an electricity-heat convertors arranged corresponding to the sheets or liquid channels holding liquid (ink), heat energy is generated at the electricity-heat convertors to effect film boiling at the heat acting surface of the recording head, and consequently the bubbles within the liquid (ink) can be formed corresponding one by one to the driving signals. By discharging the liquid (ink) through an opening for discharging by growth and shrinkage of the bubble, at least one droplet is formed. By making the driving signals into pulse shapes, growth and shrinkage of the bubble can be effected instantly and adequately to accomplish more preferably discharging of the liquid (ink) particularly excellent in response characteristic. As the driving signals of such pulse shape, those as disclosed in U.S. Pat. Nos. 4,463,359 and 4,345,262 are suitable. Further excellent recording can be performed by employment of the conditions described in U.S. Pat. No. 4,313,124 of the invention concerning the temperature elevation rate of the above-mentioned heat acting surface.

As the constitution of the recording head, in addition to the combination constitutions of discharging orifice, liquid channel, electricity-heat converter (linear liquid channel or right angle liquid channel) as disclosed in the above-mentioned respective specifications, the constitution by use of U.S. Pat. No. 4,558,333, 4,459,600 disclosing the constitution having the heat acting portion arranged in the flexed region is also included in the present invention. In addition, the present invention can be also effectively made the constitution as disclosed in Japanese Patent Laid-Open Application No. 59-123670 which discloses the constitution using a slit common to a plurality of electricity-heat converters as the discharging portion of the electricity-heat converter or Japanese Patent Laid-Open Application No. 59-138461 which discloses the constitution having the opening for absorbing pressure wave of heat energy correspondent to the discharging portion.

Further, as the recording head of the full line type having a length corresponding to the maximum width of recording medium which can be recorded by the recording device, either the constitution which satisfies its length by combination of a plurality of recording heads as disclosed in the above-mentioned specifications or the constitution as one recording head integrally formed may be used, and the present invention can exhibit the effects as described above further effectively.

In addition, the present invention is effective for a recording head of the freely exchangeable chip type which enables electrical connection to the main device or supply of ink from the main device by being mounted on the main device, or for the case by use of a recording head of the cartridge type provided integrally on the recording head itself.

Also, addition of a restoration means for the recording head, a preliminary means, etc. provided as the constitution of the recording device of the present invention is preferrable, because the effect of the present invention can be further stabilized. Specific examples of these may include, for the recording head, capping means, cleaning means, pressurization or aspiration means, electricity-heat convertors or another heating element or preliminary heating means according to a combination of these and it is also effective for performing stable recording to perform preliminary mode which performs discharging separate from recording.

Further, as the recording mode of the recording device, the present invention is extremely effective for not only the recording mode only of a primary color such as black etc., but also a device equipped with at least one of plural different colors or full color by color mixing, whether the recording head may be either integrally constituted or combined in plural number.

According to this invention, with respect to each of at least two blocks each having recording heads simultaneously operable, wherein the characteristics of the plurality of the recording elements belonging to one block are corrected simultaneously by use of means for correcting the characteristics of the recording elements in accordance with electrical energy, whereby the diversity in recording characteristics of the respective recording elements can be corrected separately at each block from a macroscopic point of view, the life of recording head can be prolonged and a high quality picture image can be obtained at low cost.

Further, according to the present invention, recording characteristic can be corrected at each block, and therefore high quality picture image free from thickness unevenness can be obtained at a low cost.

I claim:

1. A recording head having a plurality of arranged recording elements for performing a recording operation, said recording elements being selectively supplied with driving signals and being driven in response to electrical energy thereof, wherein irregularities in manufacturing can cause different said recording elements to have different characteristics responses to the same driving signals, the recording head comprising:

dividing means for dividing said plurality of arranged recording elements into a plurality of blocks each having said recording elements operable simultaneously; and correcting means for correcting the driving signals for said recording elements in each said block in accordance with the characteristic responses of said recording elements in said block.

2. A recording head according to claim 1, wherein the dividing means divides said plurality of arranged recording elements into three blocks.

3. A recording head according to claim 1, wherein each said recording element has an ejection orifice for ejecting ink.

4. A recording head according to claim 3, wherein each said recording element has a thermal energy generating means at said ejecting orifice so as to form flying drops by changing the state of the ink by applying heat thereto and ejecting ink from said orifice in accordance with the change of state of the ink.

5. A recording head according to claim 3, wherein said correcting means corrects a pulse width of a driving signal.

6. A recording head according to claim 1, wherein said correcting means corrects a current or voltage of a driving signal.

7. A recording head according to claim 1, wherein said recording elements are provided according to a width a of recording medium.

8. A recording device for performing a recording operation by using a recording head having a plurality of arranged recording elements, said recording elements being supplied with driving signals and being driven by electrical energy thereof, wherein irregularities in manufacturing can cause different said recording elements to have different characteristic responses to the same driving signals, the device comprising:

supply means for selectively supplying predetermined units of driving signals to predetermined said recording elements; and correcting means for correcting the driving signals in each predetermined unit in accordance with the characteristic responses of said recording elements to be supplied with that unit of driving signals.

9. A recording device according to claim 8, wherein each said recording element has an ejection orifice for ejecting ink.

10. A recording device according to claim 9, wherein each said recording element has a thermal energy generating means at said ejecting orifice so as to form flying drops by changing the state of the ink by applying heat thereto and ejecting ink from said orifice in accordance with the change of state of the ink.

11. A recording device according to claim 8, wherein said correcting means corrects a pulse width of a driving signal.

12. A recording device according to claim 8, wherein said correcting means corrects a current or voltage of the driving signals.

13. A recording device according to claim 8, wherein said recording elements are provided according to a width of a recording medium.

14. A method of driving a recording head having a plurality of arranged recording elements for performing a recording operation, the recording elements being supplied with a plurality of driving signals and being driven by electrical energy thereof, wherein irregularities in manufacturing can cause different recording elements to have different characteristic responses to the driving signals, the method comprising the steps of:

dividing the plurality of arranged recording elements into a plurality of blocks each having the recording elements operable simultaneously;

correcting the driving signals for each block in accordance with the characteristic responses of the recording elements in the block; and supplying the corrected driving signals to the recording elements in the block.

15. A method of driving a recording head according to claim 14, wherein each recording elements has an ejection orifice for ejecting ink.

16. A method of driving a recording head according to claim 15, wherein each recording element has a thermal energy generating means at the ejecting orifice so as to form flying drops by changing the state of the ink by applying heat thereto and ejecting ink from the orifice in accordance with the change of state of the ink.

17. A method of driving a recording head according to claim 14, wherein the correcting step corrects a pulse width of a driving signal.

18. A method of driving a recording head according to claim 14, wherein the correcting step corrects a current or voltage of a driving signal.

19. A recording head according to claim 14, wherein the recording elements are provided according to a width of a recording medium.

20. A recording head for ejecting ink by causing a change of the state of the ink by applying thermal energy thereto and the ink is ejected based on the change of state, the head comprising:

multiple resistive elements adapted to generate heat and change the state of the ink according to driving signals, wherein irregularities in manufacturing can cause different said resistive elements to have different characteristic responses to the same driving signals; and a correction circuit for correcting driving signals to be supplied to said multiple resistive elements, wherein driving signals to be supplied to plural said resistive elements adjacent to each other are corrected as unit and said correction circuit corrects the driving signals in accordance with the characteristics responses of said resistive elements to be supplied with the unit of corrected driving signals.

21. A recording head according to claim 20, further comprising a supplying circuit for supplying each unit of corrected driving signals to said plural resistive elements corresponding to that unit.

22. A recording head according to claim 21, wherein the number of said resistive elements supplied with each unit of corrected driving signals is equal to the number of driving signals in the unit.

23. A recording head according to claim 20, wherein said correcting circuit corrects a pulse width of a driving signal.

24. A recording head according to claim 20, wherein said correcting circuit corrects a current or voltage of a driving signal.

25. A recording head according to claim 20, wherein said correcting circuit corrects the driving signals in a unit in accordance with the resistance of said resistive elements to be supplied with those driving signals.

26. A recording head according to claim 20, wherein said correcting circuit corrects the driving signals in a unit in accordance with an ejection-critical voltage of said resistive elements to be supplied with those driving signals.

27. An ink jet recording apparatus comprising:

a recording head for ejecting ink by causing a change of state of ink by applying thermal energy thereto and the ink is ejected based on the change of state, said recording head having multiple resistive elements adapted to generate heat and change the state of the ink according to driving signals, wherein irregularities in manufacturing can cause different said resistive elements to have different characteristic responses to the same driving signals;

a correction circuit for correcting driving signals to be supplied to said multiple resistive elements, wherein driving signals to be supplied to plural said resistive elements adjacent to each other are corrected as a unit and said correction circuit corrects the driving signals in accordance with the characteristic responses of said resistive elements to be supplied with the unit of corrected driving signals; and a supplying circuit for supplying each unit of corrected driving signals to said plural resistive elements corresponding to that unit.

28. A recording apparatus according to claim 27, wherein the number of said resistive elements supplied with each unit of corrected driving signals is equal to the number of driving signals in the unit.

29. A recording apparatus according to claim 27, wherein said correcting circuit corrects a pulse width of a driving signal.

30. A recording apparatus according to claim 27, wherein said correcting circuit corrects a current or voltage of a driving signal.

31. A recording apparatus according to claim 27, wherein said correcting circuit corrects the driving signals in a unit in accordance with the resistance of said resistive elements to be supplied with those driving signals.

32. A recording apparatus according to claim 27, wherein said correcting circuit corrects the driving signals in a unit in accordance with an ejection-critical voltage of said resistive elements to be supplied with those driving signals.

* * * * *

UNITED STATES PATENT AND TRADEMARK OFFICE
CERTIFICATE OF CORRECTION

PATENT NO. : 5,157,411

DATED : October 20, 1992

INVENTOR(S) : NOBUHIKO TAKEKOSHI ET AL. Page 1 of 2

It is certified that error appears in the above-identified patent and that said Letters Patent is hereby corrected as shown below:

Title page, item
AT [57] ABSTRACT

Line 7, "correcting unit" should read --a correcting unit--.

COLUMN 1

Line 55, "energy," should read --energy-- and "operation" should read --operation,--.

COLUMN 3

Line 10, "is" should read --are--.
Line 37, "plurality" should read --plurality of--.
Line 56, " head," should read --heads,--.

COLUMN 4

Line 10, "head's," should read --head's--.
Line 62, "according" should read --according to--.

COLUMN 5

Line 20, "a" should be deleted.
Line 21, "register" should read --registers--.
Line 24, "connected" should read --connected to--.
Line 28, "to the corresponds" should be deleted.

COLUMN 6

Line 22, "an" should be deleted.

UNITED STATES PATENT AND TRADEMARK OFFICE

CERTIFICATE OF CORRECTION

PATENT NO. : 5,157,411

DATED : October 20, 1992

INVENTOR(S) : NOBUHIKO TAKEKOSHI ET AL.

It is certified that error appears in the above-identified patent and that said Letters Patent is hereby corrected as shown below:

COLUMN 7

Line 13, "preferrable," should read --preferable,--.
Line 53, "characteristics" should read --characteristic--.

COLUMN 8

Line 7, "claim 3," should read --claim 1,--.
Line 15, "a of" should read --of a--.
Line 67, "elements" should read --element--.

COLUMN 9

Line 13, "recording head" should read --method of driving a recording head--.
Line 30, "as unit" should read --as a unit--.
Line 32, "teristics" should read --teristic--.

Signed and Sealed this

Eleventh Day of January, 1994

Attest:

BRUCE LEHMAN

*Attesting Officer* — *Commissioner of Patents and Trademarks*